May 24, 1938.   F. G. LOGAN   2,118,440
ELECTRIC CONTROLLING APPARATUS
Filed March 30, 1936

INVENTOR
Frank G. Logan
BY
Lawrence K. Sager
his ATTORNEY

Patented May 24, 1938

2,118,440

UNITED STATES PATENT OFFICE 2,118,440

ELECTRIC CONTROLLING APPARATUS

Frank G. Logan, Mount Vernon, N. Y., assignor to Ward Leonard Electric Company, a corporation of New York Application March 30, 1936, Serial No. 71,805

13 Claims. (Cl. 171—242)

This invention relates to electric controlling apparatus where an alternating current source of energy is used, and is particularly applicable to control and change over a wide range of the voltage applied to a consumption circuit of any character, such as control of the voltage of lamp circuits for obtaining various lighting effects in theatres and the like, or where various scenic effects are desired.

The main object of the invention is to obtain the desired control with apparatus of a dependable character. Another object is to provide apparatus which will avoid the necessity of frequent inspection and repair, or replacement of parts. Another object is to provide an improved method of control and apparatus which is economical in the use of power and avoids waste of energy. Another object is to obtain an increased range of low voltage control by simple means, as when complete black-out of the lamps is desired. Another object is to automatically maintain constant any desired voltage on the consumption circuit regardless of the load on the circuit, or change of the load. Another object is to provide a method of control and apparatus which will insure stability of the circuit under all operating conditions. Another object is to provide any desired overcompounding of the circuit with increase in load, or flat compounding, or undercompounding according to requirements. Other objects and advantages will be understood from the following description and accompanying drawing.

Figure 1:
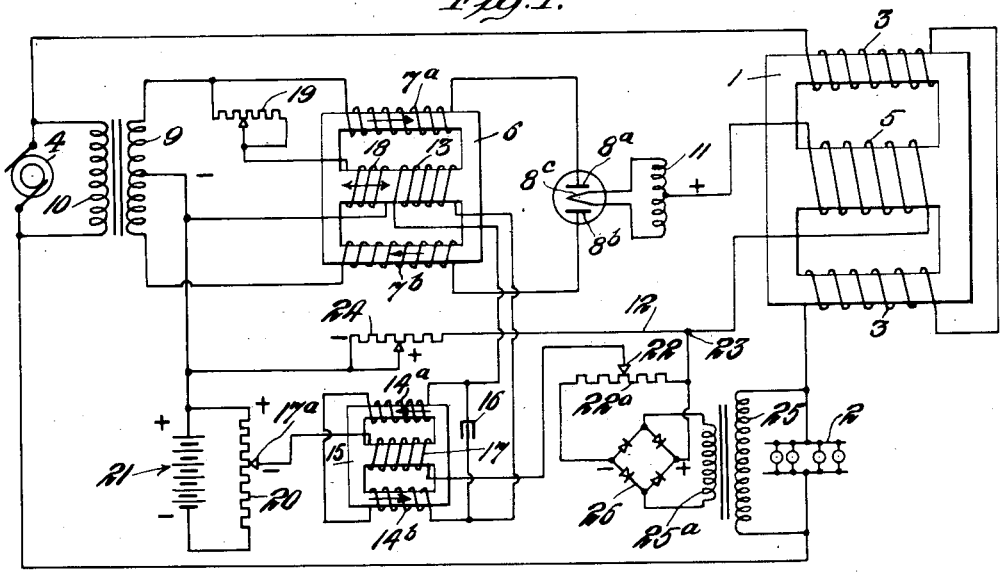
Figure 2:
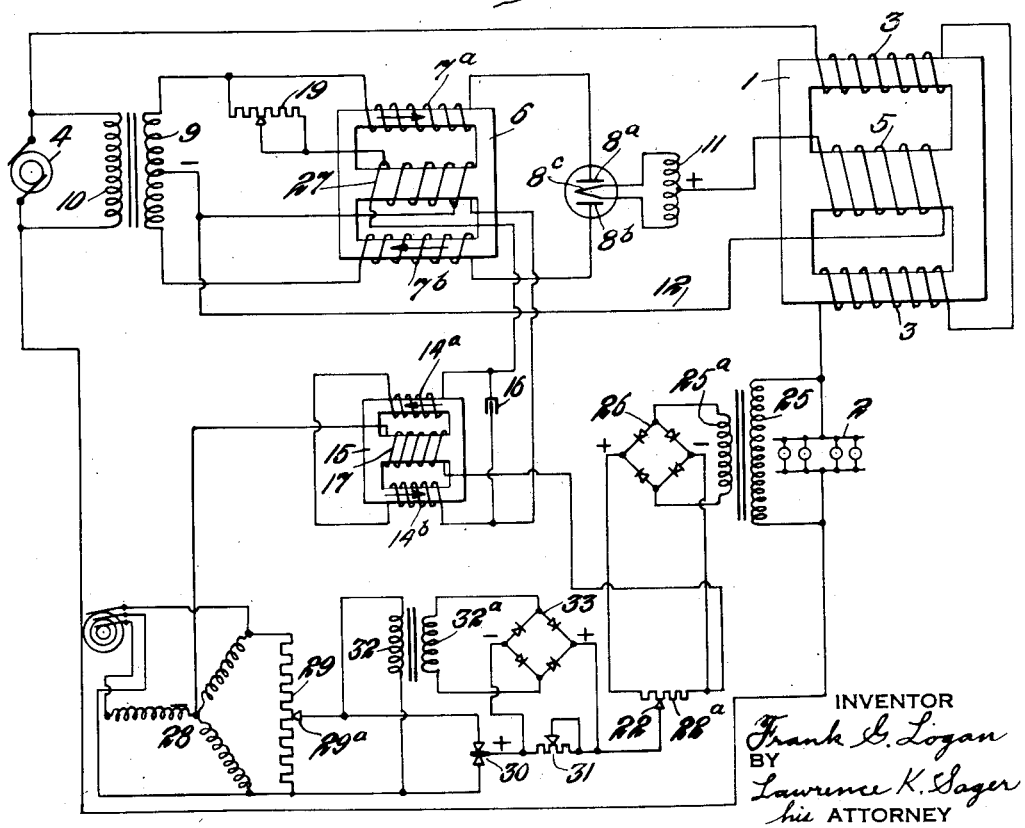

Fig. 1 is a diagram showing one embodiment of the invention; and Fig. 2 is a diagram showing another embodiment of the invention.

Referring to Fig. 1, a main reactor is shown having a core 1 of the three-leg type which controls the energy supplied to the consumption circuit 2. The main reactor may be of any suitable type and is shown as having the windings 3 on its outer legs connected in series, through which passes the alternating current which is supplied to the consumption circuit, or lamp load 2 as indicated. Any suitable source may be used for supplying the consumption circuit and for simplicity this is indicated as an alternating current generator 4 from which a lead extends to the windings 3 and the circuit continues through the load 2 back to the source 4. The central leg of the main reactor core 1 has a winding 5 which is supplied with direct current for controlling the saturation of the core in order to determine the voltage applied to the consumption circuit and to change this voltage over a wide range, as may be desired.

The current supplied to the winding 5 is controlled by an anode reactor which is indicated as having a core 6 of the three-leg form. On the two outer legs of this core are anode windings 7a, 7b, which are respectively connected to anodes 8a and 8b of a rectifier which may be of any suitable type. The other ends of the windings 7a and 7b are respectively connected to the secondary winding 9 of a transformer having a primary winding 10 connected to the source 4, although any suitable alternating current source may be used for supplying current to the anode reactor and its rectifier. The cathode 8c of the rectifier is shown connected to the usual winding 11 for receiving heating current therefrom; and from the mid-point of this winding a lead extends which is connected to one terminal of the winding 5, the other terminal of this winding being connected by a return lead 12 to a mid-point of the secondary winding 9. It is evident that current will alternately pass through the anode windings 7a and 7b to the full wave rectifier and thus supply a direct current to the control winding 5 of the main reactor.

For the purpose of controlling as desired the current which is supplied by the anode windings to the winding 5, a winding 13 is provided on the central leg of the anode reactor. This winding is connected in a closed circuit in series with the windings 14a and 14b which latter are on the outside legs of another reactor core 15 and which may be termed the control reactor. The direction of turns of the windings 14a and 14b is such as to tend to set up flux in the outside legs in a cumulative direction, as indicated by the arrows. A condenser 16 is connected across the terminals of the winding 13 for the purpose of improving the power factor of the closed circuit comprising the winding 13 and the windings 14a and 14b. The direction of turns of the anode windings 7a and 7b on the core 6 are such as to tend to cause the flux set up by current through them to pass alternately in opposite directions through the central leg of the core 6 and through the winding 13. Thus, for example, the arrow on the upper leg of the core 6 may be taken to indicate the direction of flux due to the current in winding 7a and as this is indicated as passing to the right, it follows that the flux due to winding 7a would pass through the winding 13 from right to left. The flux due to the winding 7b in the lower leg is indicated as passing to the left and it results that the flux due to winding 7b will pass through the coil 13 from left to right. In view of the fact that the current passes in the anode windings always in the same direction and that each are alternately active, it follows that the winding 13 will be subjected to a flux first in one direction and then in the opposite direction continuously. This, of course, tends to induce a current in the circuit of winding 13 and windings 14a and 14b.

The impedance of the circuit of winding 13 is controlled by changing the saturation of the core 15 of the control reactor by controlling the current supplied to a winding 17 on the central leg of the core 15. The control of the current of this winding 17 will be later explained, but it is apparent that when no current is passing in the direct current winding 17 or when a very small current is passing through it, the inductance of the control reactor is high. This causes the impedance of the circuit containing winding 13 to be high and consequently only a small current will be induced in the circuit of winding 13 by the flux in opposite directions through the winding 13. Under these conditions the reactance of the windings 7a and 7b will be high, which results in a low current being delivered to the exciting winding 5 of the main reactor and in a low voltage being applied to the consumption circuit 2. As the current in the exciting winding 17 of the control reactor is increased, the reactance of the windings 14a and 14b is decreased, permitting a correspondingly increased current to pass in the circuit of winding 13 which in turn correspondingly decreases the reactance of windings 7a and 7b. This increases the current allowed to pass to the exciting winding 5 which in turn reduces the reactance of the windings 3, thereby permitting a correspondingly increased voltage to be applied to the consumption circuit 2. Thus the voltage applied to the consumption circuit may be changed as desired over a wide range. The above explained apparatus and method of control is disclosed and claimed in my pending application Ser. No. 627,841, filed August 8, 1932, which has since matured in Patent No. 2,036,708, granted April 7, 1936.

The range of control is extended in the direction of low voltage on the consumption circuit, according to the present invention, by passing an alternating current through an exciting winding on the anode reactor for the purpose of setting up a flux in this reactor which will bias or condition the core of the reactor in such a way as to increase the reactance of the windings 7a and 7b. Thus in Fig. 1 an auxiliary winding 18 is provided on the control leg of the anode reactor which is excited by a comparatively small alternating current derived from the same source that supplies the anode windings. This winding 18 is shown connected across one-half of the secondary winding 9, although it may be otherwise connected provided it receives energy of the same frequency as the anode windings and maintains a proper phase relation thereto. A variable resistance 19 is connected in series with the winding 18 for adjustment of the current in winding 18 to a desirable value, although, instead of adjusting the current value, the desired result may be obtained by adjusting the phase of the current of winding 18 with reference to the phase of the current in windings 7a and 7b. The winding 18 must be so connected to its source, or its direction of turns must be such, when current is passing in anode winding 7a and tending to set up a flux in one direction, say to the right as indicated by the arrow on its leg, that the flux tending to be set up by winding 18 will pass to the left through the control leg and to the right through the leg of winding 7b. Similarly, when current is passing through anode winding 7b tending to set up a flux in its leg passing say from right to left as indicated by its arrow, the reversed current in winding 18 must then tend to pass flux through winding 7a in a direction through it from right to left.

It results from this relationship of fluxes that when winding 7a is inactive in supplying current to the rectifier, the winding 18 will tend to cause a flux to be passed through the core of winding 7a in an opposite direction to that which will pass when winding 7a becomes active. Thus the iron of the core of winding 7a will tend to be biased or conditioned to some degree during the inaction of winding 7a, in a direction opposite to that when winding 7a is active. This intermittent biasing of the iron during the alternate inactive periods of winding 7a, will increase the reactance of winding 7a and thus further reduce the current supplied by winding 7a and the rectifier to winding 5 when the current induced in the winding 13 is controlled by winding 17 to be low or at its minimum. In the same way the core of winding 7b is affected during its inactive alternate periods by the biasing of its iron, and is caused to similarly supply a reduced current to the rectifier during its active periods and cooperates with winding 7a to supply a low current to the rectifier and to winding 5 when the circuit of winding 13 is controlled to have high impedance. In this way the control of the low voltage applied to the consumption circuit, or the lamp load, is extended in the direction of low voltage over that which could be obtained by depending alone on high impedance of the circuit of winding 13. Complete blackout of the lamps may be obtained in this way.

Moreover, when the circuit of winding 13 is controlled to have low impedance for obtaining a full voltage on the lamp load, or other consumption circuit load, the effect of winding 18 is not objectionable because its effect at that time is so small proportionately as not to make any appreciable difference in lowering the voltage of the consumption circuit. If desired, the resistance 19 in circuit of winding 18 could be adjusted to have a high value to reduce the current in winding 18 when the voltage of the lamp circuit is at a maximum, but ordinarily such change of the resistance 19 is unnecessary.

For the purpose of controlling the current in winding 17 and thereby controlling the impedance of the circuit of winding 13 for changing the voltage applied to the consumption circuit, one terminal of winding 17 is connected to an adjustable contact 17a which is adjustable over the resistance 20 connected across any suitable direct current source, a battery 21 being shown for simplicity. The other terminal of the direct current winding 17 is shown connected to an adjustable contact 22 engaging a resistance 22a which in turn is connected at 23 to a point in the return wire 12 of the winding 5. Between the point 23 and the point at which the wire 12 is connected to the mid-point of the secondary 9, is inserted an adjustable resistance 24. The positive side of the battery 21 is connected to the return wire 12 where it leads to the mid-point of the secondary 9. The result of this connection is that the circuit of the direct current control winding 17 is subjected not only to the potential difference of the amount of the resistance 24 which is connected in circuit, but is also subjected to the amount of potential between the adjustable contact 17a of the potentiometer connection 20 and the positive side of the battery 21. As the connections are made so that these potentials will be additive in the circuit of winding 17, it follows that one advantage of this circuit is that the voltage of the direct current source 21 may be less than would otherwise be necessary because the amount of the utilized voltage of its battery is supplemented by the additive voltage derived from the circuit of the exciting winding 5.

The circuit of the direct current controlling winding 17 is also subjected to another voltage imposed upon that portion of the resistance 22a which is in circuit. This voltage is in opposition to the other voltages imposed upon the circuit of winding 17 and is dependent upon and is derived from the voltage of the consumption circuit or lamp circuit voltage. Thus the primary 25 of a transformer is connected to opposite sides of the consumption lamp circuit 2. The secondary 25a of this transformer is connected to opposite points of a bridge rectifier 26 which may be of any suitable type but is indicated as of the copper oxide form. The intervening opposite terminals of the bridge-connected rectifier are connected to the terminals of the resistance 22a. Thus a direct current potential is imposed upon the terminals of the resistance 22a which is always proportionate to the voltage of the consumption circuit, and the connections are made such that this potential is, as already stated, in opposition to the other potentials imposed upon the circuit of the controlling winding 17. An assumed relationship of positive and negative terminals is indicated on the drawing.

In operation the voltage applied to the consumption circuit and the brilliancy of the lamps, in case a lamp load is used, will be changed over a wide range, as desired, by movement of the control contact 17a over the resistance 20. This adjustment of the control contact will change the value of the saturating direct current in the winding 17 and, as already explained, change the reactance of the anode windings 7a and 7b and thereby change the current passed through the direct current saturating winding 5 of the main reactor. This changes the reactance of the alternating current windings 3 of the main reactor to apply any desired voltage to the consumption circuit over a wide range. The alternating current winding 18 of the anode reactor will function to increase the range at the low voltages of the consumption circuit in the manner already explained.

The apparatus will also serve to maintain approximately constant any desired voltage imposed upon the consumption circuit, regardless of the load or change of load, by the controlling effect of the rectifying unit 26 on the controlling current of the winding 17. Thus, assuming a certain voltage as being imposed upon the consumption circuit, if the load be increased, the voltage applied to the consumption circuit would tend to fall. This drop in voltage would be reflected in a decrease of the bucking volts imposed upon the resistance 22a; and this decrease of opposing voltage will permit an increased current to pass in the circuit of the control winding 17 which in turn will reduce the impedance of the winding 13, thereby reducing the reaction of the anode windings 7a and 7b, resulting in an increased current in the control winding 5 of the main reactor which reduces the reactance of the windings 3 of the main circuit, which permits an increased voltage to be applied to the consumption circuit. Thus an increase of load on the consumption circuit results in a compensating effect by increasing the voltage applied to the consumption circuit so that the drop in consumption circuit voltage which would otherwise occur is largely counteracted. Similarly, if the load on the consumption circuit be decreased, an increased potential will be imposed upon the resistance 22a and by increased bucking effect will reduce the current in the control winding 17, increasing the impedance of the circuit of winding 13, increasing the reactance of windings 7a and 7b resulting in a decrease of current in the saturating winding 5 of the main reactor which has the effect of increasing the reactance of the main windings 3 and thus causes a reduced voltage to be applied to the consumption circuit and thereby approximately compensates for the increase of voltage which would otherwise occur with decrease of the load. Adjustment of the contact 22 on the resistance 22a may be made for determining the desired compensating effect of the bucking voltage derived from the voltage of the consumption circuit and after this adjustment has been made to a proper amount, it may remain fixed.

The connection of the control winding 17 across the resistance 24 of the circuit of the direct current winding 5 of the main reactor so as to give an aiding potential in the circuit of winding 17 to the voltage derived from the direct current source 21, not only tends to reduce the required voltage of the source 21, with resultant economy in the size and capacity of the control apparatus and of the wires connecting the various parts, but also serves as a means for obtaining over-compounding, or flat compounding, or under-compounding, as may be desired, of the voltage of the consumption circuit with change of load. The compounding effect of the resistance 24 is dependent upon the fact that a saturable reactor requires a greater increment of saturating current than corresponding resulting increments of the voltage obtained in the consumption circuit and also upon the fact that the saturating current for obtaining a desired voltage at full load on the consumption circuit is much greater in proportion than is required for obtaining the same voltage at a smaller load. For example, for maintaining 65 volts on the consumption circuit at full load may require one-half an ampere in the saturating winding 5 of the main reactor, whereas at one-third load the same voltage of 65 may be maintained on the consumption circuit with only one-eighth of an ampere in the saturating winding 5 of the main reactor. The compounding effect of the resistance 24 may be understood by further considering the previously described action with reference to the effect of a change of load. Thus with increase of load the tendency for the consumption circuit voltage to drop may be approximately overcome by the increase of current in the saturating winding 5, due to change of the bucking potential, as already explained. This increase of current will of course cause an increased drop of potential in the resistance 24 which results in increasing the voltage imposed upon the circuit of the control winding 17 in a direction additive to that of the source 21. This in turn further increases the current in the saturating winding 5 of the main reactor which permits a further increase of voltage to be applied to the consumption circuit by further reducing the reaction of the windings 3 of the main reactor. Thus an increase of load results in the bucking voltage of the resistance 22a serving to maintain the voltage at the load approximately constant but the effect of change of drop in the resistance 24 serves to actually increase the voltage applied to the consumption circuit with an increase of load. Thus for any position of the control contact 17a, the voltage applied to the consumption circuit may increase from low load up to full load giving an overcompounding effect. It is evident that adjustment of the amount of the resistance 24 included in the circuit of the control winding 17 may be made such as to give any desired overcompounding effect. Similarly, the adjustment of this resistance may be made such as to give flat compounding throughout the change of load by causing the amount of the compounding effect of this resistance to be such as to counteract any slight drop in voltage which would otherwise occur with increased load if dependence were made solely upon the compensating effect of the bucking potential of the resistance 22a. Obviously, for undercompounding which would ordinarily not be desired, the adjustment of the resistance 24 may be made such as to give any desired undercompounding. Thus for any desired compounding effect the resistance 24 may be adjusted to include the required amount thereof in the circuit of the control winding 17 and after such adjustment is attained, it may remain a fixed amount.

An important advantage of this improvement is that for all positions of adjustment of the controlling contact 17a and for all conditions of load, or change of load, the circuit conditions are at all times stabilized as controlled by the bucking potential imposed upon the direct current control circuit of winding 17, and also by reason of the fact of the control being dependent upon the saturating current of a reactor being obliged to increase in greater proportion than the resulting increase in voltage on the consumption circuit, and also being obliged to increase in greater proportion than the increase of load on the consumption circuit.

Figure 2 is similar to the disclosure of Figure 1 except in certain features, and corresponding parts are similarly numbered. One feature of difference is that in Figure 2, instead of using the special winding 18 of Figure 1 for extending the range of low voltage applied to the consumption circuit, the winding 18 is combined with the winding 13 to form the winding 27 for serving the purpose of both windings. The action of this winding 27 will be the same as the action of winding 13 in its closed circuit and the imposition of the voltage from the source upon the winding 27 by the connections thereto of the leads from the resistance 19 and from the neutral point enables the winding 27 to create a flux for biasing the cores of the anode windings 7a and 7b during their inactive periods in the same way as described with reference to the winding 18 of Fig. 1.

Figure 2 also discloses a different method of supplying an aiding voltage in the circuit of the direct current control winding 17 and also discloses an alternating current source from which the current of this circuit is derived. Thus a three-phase source 28 is indicated having a resistance or potentiometer connection 29 across two phases of the star-connected source 28. Between the adjustable contact 29a engaging the resistance 29 and one terminal of the resistance 29 is connected a full wave rectifier 30. The common terminal of this rectifier is connected to a resistance 31 which in turn is connected in series with the resistance 22a from which the circuit continues through the controlling coil 17 and then to the neutral of the source 28. The potential imposed upon the resistance 22a in this circuit is reflective of the voltage applied to the load in the same manner as described with reference to Fig. 1; and this potential is in opposition to the potential derived from the source 28 by the adjustable contact 29a. Another potential is also imposed in this controlling circuit in a direction which is additive to that derived from the source 28. This is accomplished by a transformer whose primary 32 is connected across the lead from the contact 29a and the outside lead of the impedance 29. The secondary 32a of this transformer is connected to opposite terminals of a bridge-connected rectifying unit 33, the direct current terminals of which are connected across the resistance 31. The connection of the rectifying unit 33 to the resistance 31 is made such that the potential imposed upon the resistance 31 by the rectifier 33 will be additive to that derived from the source 28.

In Fig. 2 the bucking potential imposed upon the resistance 22a will serve to maintain the voltage of the consumption circuit approximately constant at any desired adjusted value in the manner described with reference to Fig. 1, although the compounding effect of the resistance 24 of Fig. 1 will not be present for obtaining refined control of the consumption circuit voltage. The purpose of adding the voltage derived from the rectifying unit 33 is to permit the use of a lower controlling or pilot voltage at the source 28 with resulting reduction in capacity of the apparatus and interconnecting circuits. It is evident that when the adjustable contact 29a is moved to increase the voltage applied to the winding 17 and thereby increase the voltage applied to the consumption circuit in the manner previously explained, the voltage derived from the rectifying unit 33 will also be raised and by its aiding potential will compensate for the increased bucking potential imposed upon the resistance 22a by the resultant increase in voltage of the load circuit. Thus the imposition of the changeable aiding voltage upon the control circuit enables the required range of the source 28 to be much less than would otherwise be necessary.

Although particular embodiments of this invention have been described, various modifications may be made without departing from the scope thereof. For example, the reactors may be of any suitable form other than the three-leg type indicated, and instead of using a common core in these reactors, the same may be divided in sections, or separate cores may be utilized each having its own winding properly connected. Also various forms or types of rectifiers may be used and other modifications made according to particular requirements or choice.

The invention claimed is:

1. The combination of an alternating current source, a reactor, a rectifier, an anode winding on said reactor supplied with current intermittently from said source and delivering current intermittently to said rectifier, and a winding on said reactor receiving alternating current continuously from said source for passing flux through said anode winding during its alternate inactive periods in a direction reverse to that of its flux during its active periods.

2. The combination of an alternating current source, reactive means, a rectifier, anode windings on said reactive means supplied with current intermittently from said source and delivering current intermittently to said rectifier, and a winding related to said reactive means and receiving current from said source for passing flux through said anode windings successively in a direction reverse to that of the flux through said anode windings during their active periods.

3. The combination of an alternating current source, reactive means, a rectifier, anode windings on said reactive means supplied with current intermittently from said source and delivering current intermittently to said rectifier, and a winding on said reactive means for passing a flux through said anode windings during their inactive periods for biasing the cores of said anode windings.

4. The combination of an alternating current source, a reactor having a core, a rectifier, anode windings on said core supplied with current intermittently from said source and delivering current intermittently to said rectifier, and a winding on a portion of the core of said reactor receiving alternating current from said source for passing flux successively through said anode windings during their respective inactive periods in a direction reverse to that of their flux during their active periods.

5. The combination of an alternating current source, a reactor having a core, a rectifier, anode windings on said core supplied with current intermittently from said source and delivering current intermittently to said rectifier, a winding on a portion of the core of said reactor receiving alternating current from said source for passing flux successively through said anode windings during their respective inactive periods in a direction reverse to that of their flux during their active periods, a consumption circuit, a reactor having a winding supplying current to said circuit and adapted to receive current from an alternating current source, and a saturating winding on said last-named reactor supplied with current from said rectifier.

6. A consumption circuit, a reactor, a winding on said reactor adapted to receive current from an alternating current source and supplying current to said consumption circuit, a saturating winding on said reactor, means for supplying a direct current to the circuit of said saturating winding, an impedance device in the circuit of said saturating winding, an adjustable auxiliary source of direct current, means in the circuit of said adjustable auxiliary source for controlling the current delivered to said saturating winding, said impedance device being connected in the circuit of said adjustable auxiliary source so that the drop in potential of said impedance device will be additive to the voltage of said auxiliary source, and means for deriving a direct current potential responsive to change of voltage in the consumption circuit and for applying said potential in a bucking direction in the circuit of said adjustable auxiliary source.

7. The combination of a consumption circuit, a reactor, a winding on said reactor adapted to receive current from an alternating current source and to deliver current to said consumption circuit, a saturating winding on said reactor, means for supplying a direct current to said saturating winding, and means for adjustably controlling the current supplied to said saturating winding, said means being responsive to change of voltage of the consumption circuit, and to change of current in said saturating winding.

8. The combination of a consumption circuit, a reactor, a winding on said reactor adapted to receive current from an alternating current source and to deliver current to said consumption circuit, a saturating winding on said reactor, a resistance in series in the circuit of said saturating winding, means for supplying a direct current to said saturating winding, and means for adjustably controlling the current supplied to said saturating winding, said latter means being responsive to change of current in said resistance.

9. The combination of a consumption circuit, a reactor, a winding on said reactor adapted to receive current from an alternating current source and supplying current to said consumption circuit, a saturating winding on said reactor, an adjustable direct current source, means responsive to change of adjustment of said direct current source for controlling the current in said saturating winding, and means in the circuit of said direct current source for imposing a potential on said circuit additive to that of said adjustable direct current source and responsive to change of adjustment of said direct current source.

10. A consumption circuit, a reactor, a winding on said reactor adapted to receive current from an alternating source and supplying current to said consumption circuit, a saturating winding on said reactor, a second reactor having an anode winding adapted to receive current intermittently from an alternating current source, a rectifier supplied with current from said last-named winding and for delivering current to said saturating winding, an inductive winding on said second reactor subjected to change of flux resulting from current through the first-named winding on said second reactor, a third reactor, a winding on said third reactor connected in closed circuit with said inductive winding on said second reactor, an adjustable source of direct current, a saturating winding on said third reactor connected in the circuit of said adjustable source, means for imposing a potential in the circuit of said adjustable source and of said saturating winding on the third reactor in a direction additive to that of said adjustable source and responsive to change of adjustment of said adjustable source, and means for imposing in the circuit of said adjustable source and of said saturating winding on said third reactor a bucking potential responsive to the voltage of said consumption circuit.

11. A consumption circuit, a reactor, a winding on said reactor adapted to receive current from an alternating source and supplying current to said consumption circuit, a saturating winding on said reactor, a second reactor having an anode winding adapted to receive current intermittently from an alternating current source, a rectifier supplied with current from said last-named winding and for delivering current to said saturating winding, an inductive winding on said second reactor subjected to change of flux resulting from current through the first-named winding on said second reactor, a third reactor, a winding on said third reactor connected in closed circuit with said inductive winding on said second reactor, an adjustable source of direct current, a saturating winding on said third reactor connected in the circuit of said adjustable source, means for imposing a potential in the circuit of said adjustable source and of said saturating winding on the third reactor in a direction additive to that of said adjustable source and responsive to change of current in said first-named saturating winding, and means for imposing in the circuit of said adjustable source and of said saturating winding of said third reactor a bucking potential responsive to the voltage of said consumption circuit.

12. The combination of a consumption circuit, a reactor, a winding on said reactor adapted to receive current from an alternating current source and delivering current to said consumption circuit, a saturating winding on said reactor, a rectifier for supplying current to said saturating winding, reactive means having anode windings connected to said rectifier, a winding on said reactive means subjected to an alternating flux created by said anode windings, means for controlling the impedance of the circuit of said last-named winding, and an exciting winding related to said reactive means and adapted to receive alternating current for passing flux through said anode windings during their intermittent inactive periods in a direction opposite to that which passes through said anode windings when active in transmitting current to said rectifier.

13. The combination of a consumption circuit, a reactor, a winding on said reactor adapted to receive current from an alternating current source and delivering current to said consumption circuit, a saturating winding on said reactor, a rectifier for supplying current to said saturating winding, reactive means having anode windings connected to said rectifier, a winding on said reactive means subjected to an alternating flux created by said anode windings, means for controlling the impedance of the circuit of said last-named winding, and a source of alternating current connected to said last-named winding on said reactive means for supplying an alternating exciting current thereto for biasing the iron of the core within said anode windings during their respective inactive periods.

FRANK G. LOGAN.